Patented Dec. 13, 1949

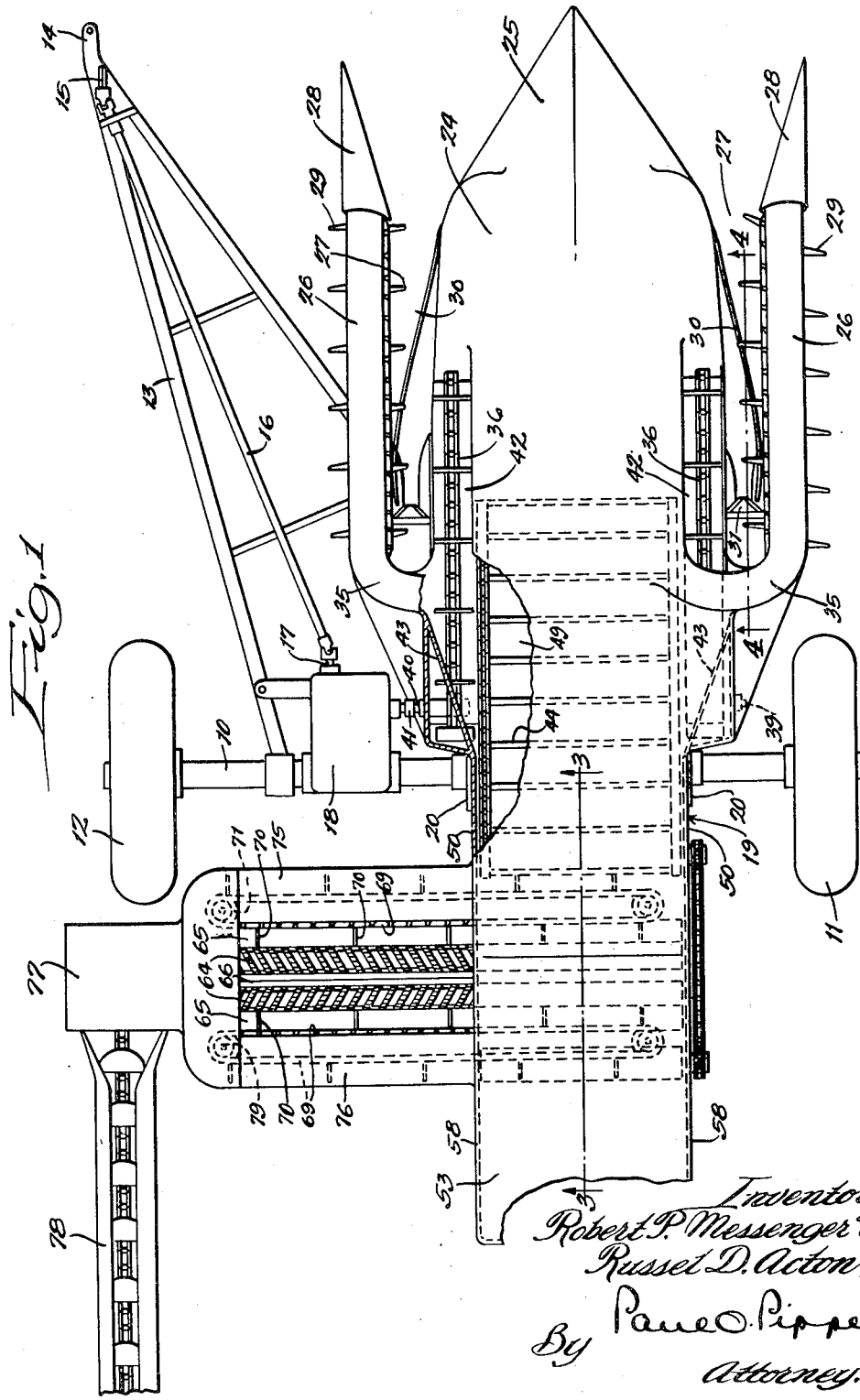

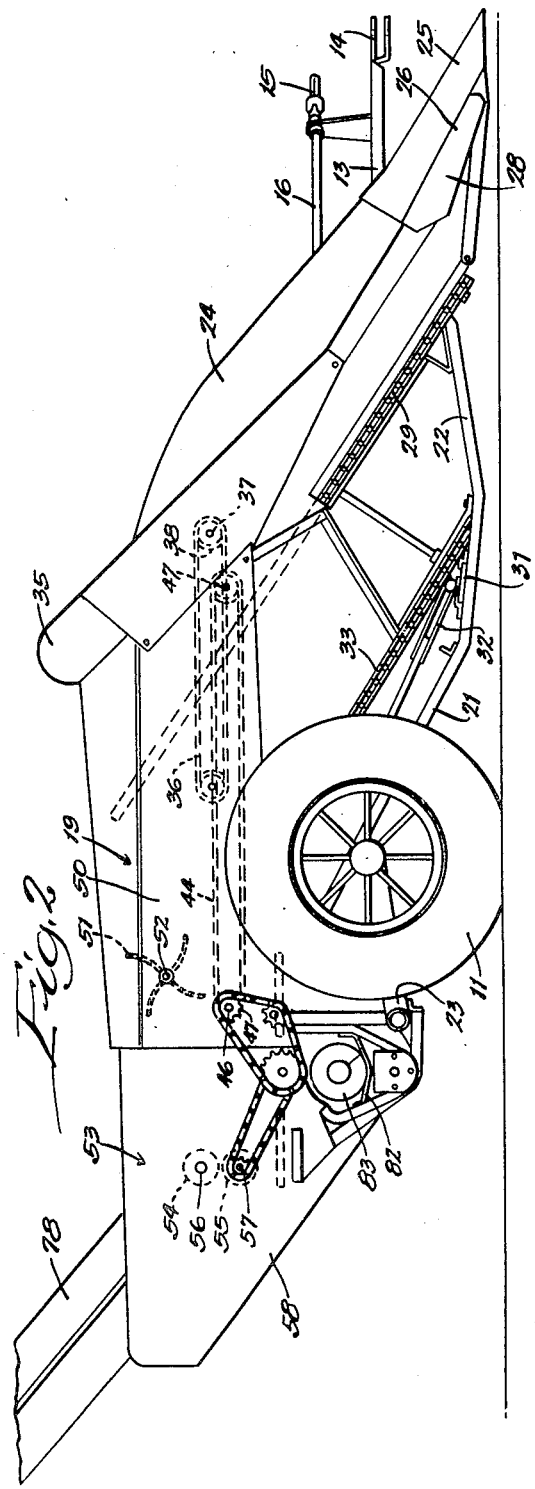

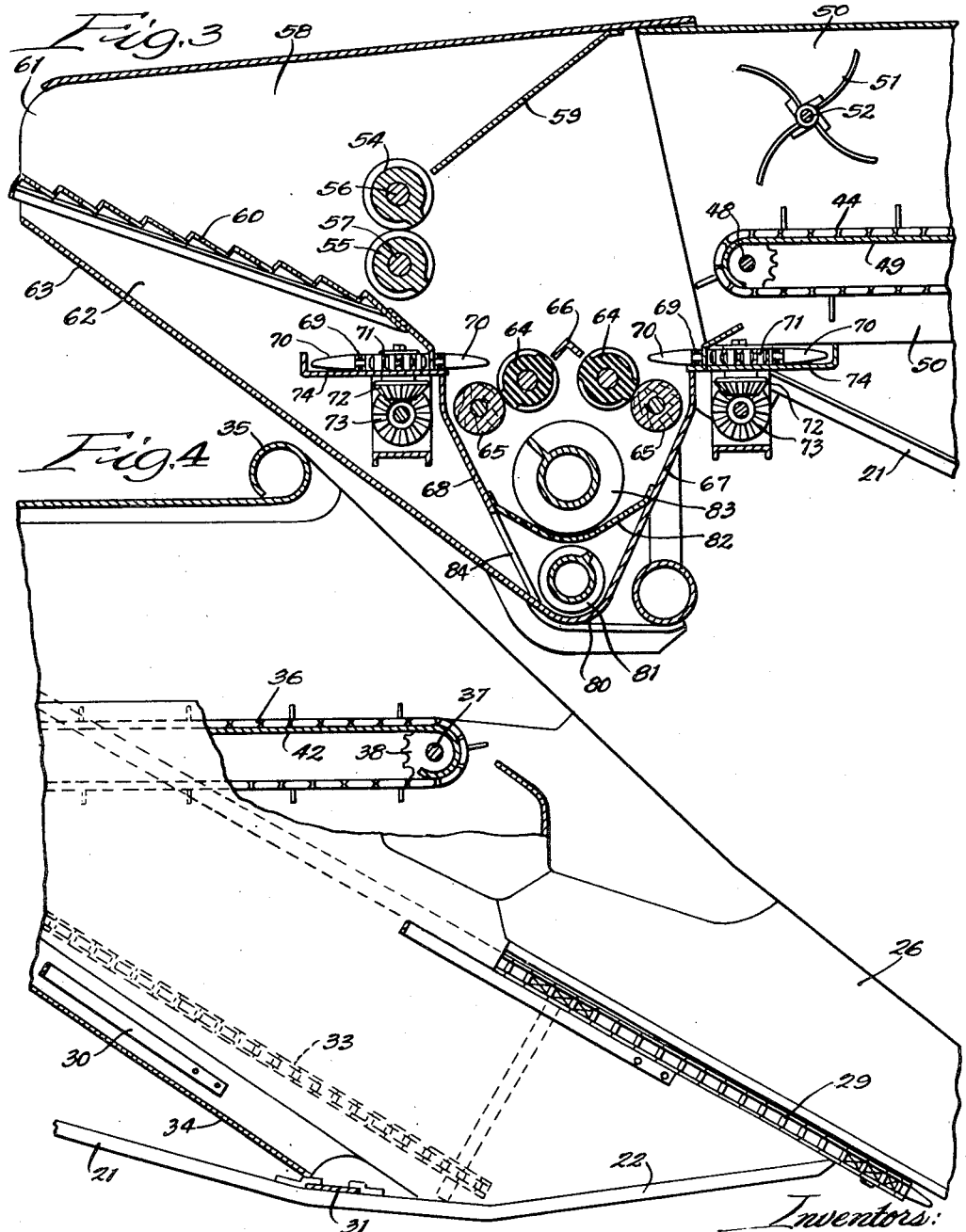

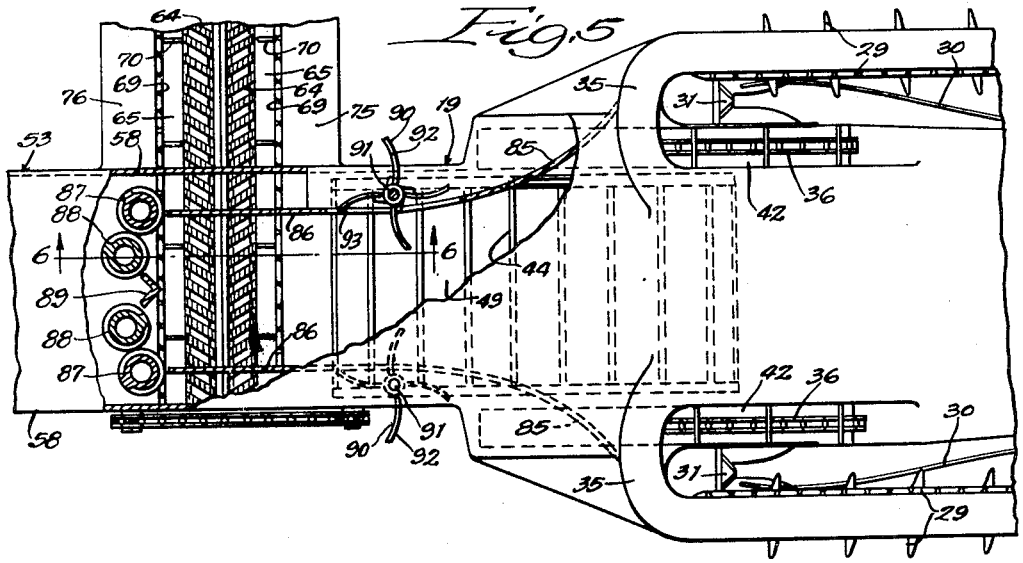
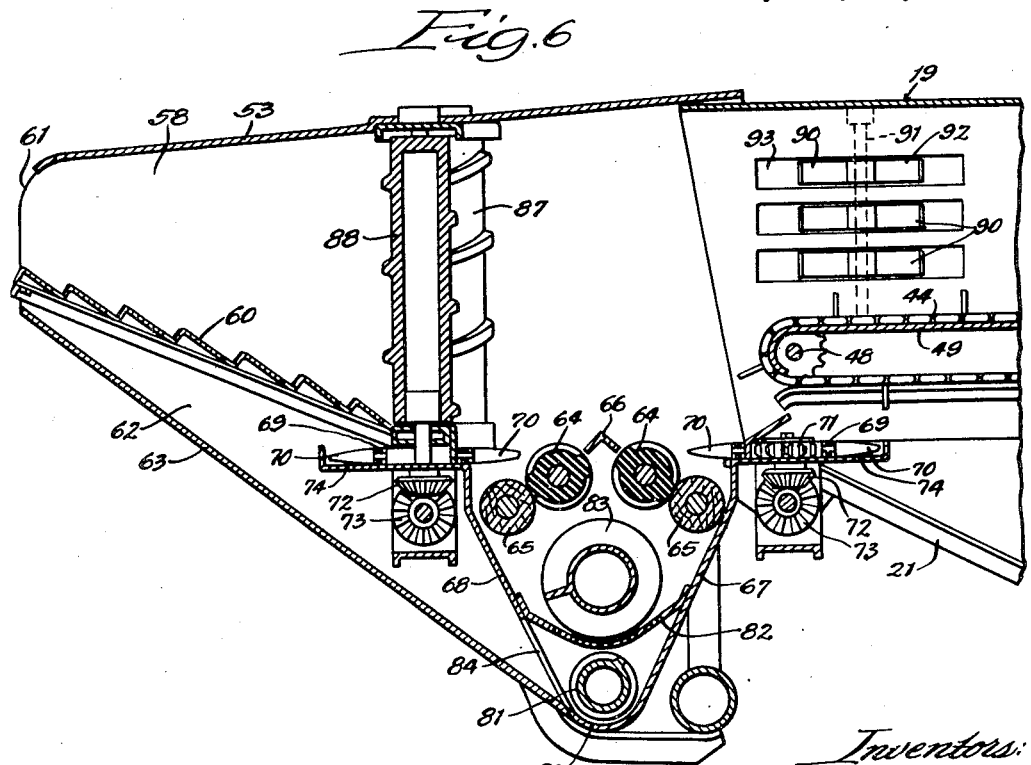

2,491,195

UNITED STATES PATENT OFFICE 2,491,195

CORN HARVESTER

Robert P. Messenger, Kenilworth, and Russel D. Acton, Chicago, Ill., assignors to International Harvester Company, a corporation of New Jersey Application March 26, 1945, Serial No. 584,912

1 Claim. (Cl. 56—66)

This invention relates to corn harvesters. More particularly it relates to a corn harvester of the stalk severing type. It has been a common practice for many years to harvest corn by snapping the ears from standing stalks by passing the stalks through inclined snapping rolls carried by a traveling machine. It has been proposed to sever the stalks and to carry the stalks through a snapping mechanism whereby the shelled grain which is often removed from the ears during the snapping operation may be saved. In this stalk severing or cut-off type harvester the stalks are usually moved into a substantially horizontal position after severing and carried longitudinally of the traveling machine to snapping and husking mechanisms.

The principal object of the present invention is to provide a two-row corn harvester of the stalk severing type with a single snapping and husking mechanism.

Another important object is to provide a single longitudinally extending conveyor for receiving stalks from separate stalk severing and conveying devices.

A more detailed object is to provide conveying means for receiving stalks from a severing mechanism and moving them laterally to a single central conveyor.

These objects and others which will be apparent from the drawings and the detailed description to follow are acomplished by a machine such as illustrated in the drawings in which:

Figure 1 is a plan view showing a two-row corn harvester of the trail-behind type;

Figure 2 is a side elevation of the structure of Figure 1;

Figure 3 is a vertical longitudinal section taken on the line 3—3 of Figure 1;

Figure 4 is a vertical longitudinal section taken on the line 4—4 of Figure 1;

Figure 5 is a view similar to Figure 1 of the rear portion of a similar construction with a portion broken away to show a modified snapping roll construction; and Figure 6 is a vertical longitudinal section taken on the line 6—6 of Figure 5.

In Figure 1, a wheeled frame structure is illustrated to provide a traveling support for a corn harvester embodying the invention. Said frame structure includes a transverse axle 10, supporting wheels 11 and 12 and a draft frame 13 which is rigidly connected to the axle 10 and is adapted to be connected to the draw-bar of a tractor at the front end 14 thereof.

To supply power from the tractor power take-off a connecting shaft 15 is shown connected by a universal joint to a drive shaft 16 mounted on the draft frame 13. Said shaft is connected by a universal joint to an input shaft 17 extending from a gear housing 18 which is mounted on the frame structure.

The entire housing structure for the corn harvester will be designated in its entirety by the reference character 19. Said housing is generally of the self-supporting type now in use for combines and various types of farm implements in which the sheet metal of the housing provides structural strength to support the various elements mounted thereon. Bracing is of course resorted to at critical points to provide the necessary strength. In the showings only certain of the various bracing members have been illustrated as the invention resides not in the specific structure but in the functional elements and their structural and functional relationship to each other. A housing 19 is supported on the frame structure by brackets 20 which are secured to the axle 10. Figure 3 shows certain of the bracing and reinforcing members for the housing including a downwardly inclined member 21 which extends adjacent the ground to provide a support for the cutting mechanism and forwardly at 22 to provide support for the gathering mechanism of the harvester and the conveying chains mounted thereon. A rearwardly extending member 23 is also shown in Figure 2, said member representing a portion of the frame structure for carrying the husker unit at the rear of the harvester.

Housing 19 is provided with a centrally extending front end portion 24 which is shaped at its front end to provide a divider 25 of a conventional construction. Said divider is adapted to pass between two rows of corn to be harvested for lifting the stalks and diverting them to the sides of the front portion 24.

In cooperation with said front portion 24 and the divider 25, forwardly extending structures 26, spaced from the sides of the housing portion 24, provide gathering throats 27. A gathering shoe 28 is mounted at the forward end of each of the structures 26. Gathering chains 29 are mounted on the structures 26 for engaging the stalks and carrying them inwardly and upwardly. Resilient pressure members 30 are shown for urging the stalks against the conveyor 29.

A conventional reciprocating cutter having a sickle 31 is shown in Figures 1, 2 and 4. Said sickle may be driven by any conventional mechanism such as by a pitman 32 indicated in Figure 2. After the stalks are severed, an additional gathering chain 33 engages the butts of the stalks and moves them upwardly along a butt pan 34 as shown in Figure 4. The chain 33 is driven at a higher speed than the chain 22 to thereby move the stalks into a generally horizontal position as they move upwardly through the throat 27. Said throat terminates in a curved upper portion 35 which engages the stalks and assists in moving them into a horizontal position. As the stalks reach the upper portion of the throat they are discharged laterally onto a horizontal conveyor 36. As shown in Figure 1, there is a horizontal conveyor 36 at each side of the housing structure and alongside each of the throats 27. Figure 4 indicates a shaft 37 and a sprocket 38 for supporting the front end of the conveyor 36. Figure 1 indicates a shaft 39 for supporting the rear end of one of the conveyors and a shaft 40 for supporting the rear end of the other conveyor. A drive connection 41 is shown as connecting the shaft 40 to a shaft extending from the gear housing 18. This power drive connection is only illustrative of the power drive connection for the entire harvester structure. It is understood that any suitable mechanisms known in the art may be employed for driving the gathering chains and the horizontal conveyors 36. A platform or table 42 is illustrated lying underneath the upper flight of the horizontal conveyor 36. Said table forms a guide for the conveyor and a support for receiving stalks from the gathering mechanism. A diagonal deflector wall 43, shown in section in Figure 1, directs the butt ends of the stalks away from the horizontal conveyor 36 and onto a central horizontal conveyor 44. It will be noted that the construction at each side of the conveyor 44 is symmetrical and that the severed stalks from each of the two gathering units are delivered onto the central conveyor 44. Figure 2 illustrates a rotatable rear support 46 for the conveyor 44 and a rotatable front support 47. Figure 3 also shows the rotatable front support which includes a transverse drive shaft 48. A horizontal platform 49 is shown in Figure 3 which extends between side walls 50 of the housing 19 to form a table for supporting the stalks as they are conveyed rearwardly by the central conveyor 44. A beater 51 carried by a transverse shaft 52 is mounted between the side walls 50 above the front end of the conveyor 44 to facilitate the movement of stalks in a longitudinal direction.

Rear portion 53 of the housing 19 supports a pair of transversely positioned snapping rolls 54 and 55. Said rolls are supported by shafts 56 and 57, respectively, which project through the side walls 58 of said rear portion 53 of the housing. A deflector wall 59 extending transversely across said housing portion terminates adjacent the upper snapping roll 54 and acts to divert the longitudinal moving stalks to the snapping rolls.

An upwardly slanting non-clogging transverse grid structure 60 extends from adjacent the bottom of the lower snapping roll 55 to the rear end of the portion 53 of the housing, being spaced from the top wall of said portion to provide a discharge opening 61 through which the snapped stalks are discharged. The grid 60 receives the shelled grain passing through the snapping rolls and drops it downwardly into a receptacle 62 formed by a downwardly inclined wall 63 joining the side walls 58.

A plurality of husking rolls including adjacent rolls 64 and mating rolls 65 placed at a lower level are arranged transversely and horizontally between the terminating end of the conveyor 44 and the snapping rolls 54 and 55 which are longitudinally spaced therefrom. A deflector 66 arranged between pairs of husking rolls diverts ears to both sets of rolls. The husking rolls are arranged between two downwardly and centrally inclined walls 67 and 68. Said walls are closely spaced at their upper ends with respect to the husking rolls 65 to confine the ears in husking position. As previously stated, the rolls 65 are lower than the rolls 64. To provide means for moving the ears along over the husking rolls an ear forwarding chain 69 is located in a horizontal plane with ear engaging elements 70 positioned to pass along the adjacent portions of the pair of rolls at each side of the deflector 66. Means including a sprocket 71, a bevel gear 72 and a bevel gear 73 are illustrated for driving said chain. A supporting table 74 is also shown for carrying the chain on its return movement around the supporting and driving sprocket. The walls 67 and 68 extend transversely beyond the housing 19, as shown in Figure 1, and are provided with outwardly flared extension walls 75 and 76. Said walls together with the walls 67 and 68 provide a hopper construction for receiving and conveying the snapped ears transversely with respect to the housing 19. The rolls may be supported in any conventional bearing means and may be driven by any suitable drive means.

A hopper construction 77 is attached to the walls 75, 76, 67 and 68 to receive the ears and to provide means for delivering them to an elevator 78.

The ear forwarding chain 69 is provided with a rotatable support adjacent the hopper 77 as indicated in Figure 1. An identical gathering chain 69 is mounted forwardly of the other set of husking rolls and is identified by the same reference characters.

The walls 67 and 68 are joined by a circular bottom 80 in which an auger conveyor 81 is rotatably mounted. A curved perforated wall 82 extends between the walls 67 and 68 above the auger conveyor 81 and spaced a substantial distance below the husking rolls. An auger conveyor 83 is rotatably mounted above the curved wall 82. Said conveyor is adapted to move the husks and other material passing through the husking rolls in an axial direction to the right with reference to Figure 1 and outwardly as shown in Figure 2 through an opened end whereby the material is discharged on the ground.

The shelled grain passing through the perforated bottom 82, as well as shelled grain collected by the inclined wall 63 and passing through an opening 84 in the inclined wall 68, is delivered by the conveyor 82 to the hopper 77 where it is elevated along with the husked ears. The husking bed construction, the husk eliminating means and the main saving means are in themselves only a part of this invention as indicating a single transversely arranged husking mechanism operable to receive and husk the snapped ears from a two-row machine. In the modification shown in Figures 5 and 6, the gathering and stalk conveyor mechanism is substantially the same up to the central horizontal conveyor and the same reference characters will be used to designate the same parts. The housing structure will also be designated by the same reference character 19 and the rear housing extension will be designated by the same reference character 53 with side walls 58. The entire husking structure and ear forwarding chains will also bear the same reference characters.

In the modification of Figures 5 and 6, curved deflectors 85 deflect the stalks from the conveyors 36 to the central conveyor 44. The curved walls 85 continue with spaced parallel walls 86 which terminate adjacent the outer rolls of a snapping mechanism which include outer vertical rolls 87, inner vertical rolls 88 and a central deflector 89. It will be noted that the rolls 88 are rearwardly of the rolls 87, whereby the passage of stalks is shunted over from the walls 86 to the adjacent portions of the rolls through which they pass in a snapping operation. The deflector 89 also divides the stalks and delivers them to the two pair of snapping rolls. To facilitate the passage of stalks in a longitudinal direction to the snapping rolls, a pair of beaters or stalk forwarding devices 90 are arranged on vertical axes 91 in the housing 19. Said beaters are provided with a plurality of stalk engaging beater elements or flaps 92 which project through a series of parallel slots or openings 93 provided in the walls 85. It is to be understood that the links of the flaps and their location relative to the horizontal conveyor 44 are such as to facilitate passage of the stalks through the housing and into the snapping mechanism.

In the operation of both forms of the device described, that is the structure of Figures 1 to 4, inclusive, and the modification shown in Figures 5 and 6, the stalks are severed during passage of the machine through the field and are delivered by the conveyor chains and the conveyors 36 onto the central conveyor 44. By this means the mechanism of a two-row harvester of the stalk severing type is materially simplified as only one long horizontal conveyor is utilized and as only one snapping and husking mechanism is required.

It is to be understood that the stalks may be gathered and conveyed by other mechanisms, and that the essence of the invention is the provision of a single central conveyor for receiving stalks from two stalk severing and gathering mechanisms and delivering said stalks substantially horizontally in an effective position for snapping into a rearwardly located snapping mechanism. It is also contemplated that any modifications in the structure falling within the scope of the appended claim are parts of the invention.

What is claimed is:

A corn harvester comprising a mobile frame structure, means forming a pair of laterally spaced stalk-receiving throats on said structure, cutting mechanism for severing stalks positioned in said throats, conveying means extending rearwardly from said cutting mechanism, laterally spaced substantially horizontal conveyors closely adjacent the throats, said conveying means delivering the stalks onto said conveyors butt ends first, a centrally positioned rearwardly delivering conveyor, means at the forward ends of the horizontal conveyors for moving stalks laterally onto the central conveyor, and stalk feeding rolls positioned at the rear of said conveyor.

ROBERT P. MESSENGER.
RUSSEL D. ACTON.

REFERENCES CITED

The following references are of record in the file of this patent:

UNITED STATES PATENTS

| Number | Name | Date |
| --- | --- | --- |
| 899,979 | Fisher et al. | May 11, 1869 |
| 1,165,758 | Cooke | Dec. 28, 1915 |
| 1,310,133 | Paxton | July 15, 1919 |
| 1,658,353 | Ronning et al. | Feb. 7, 1928 |
| 1,940,851 | Everett et al. | Dec. 26, 1933 |
| 1,977,790 | Andrews | Oct. 23, 1934 |
| 2,385,193 | Burgin | Sept. 18, 1945 |
| 2,420,543 | Johnson et al. | May 13, 1947 |
| 2,427,861 | Johnson | Sept. 23, 1947 |